W. E. THATCHER.
FISH HOOK.
APPLICATION FILED AUG. 22, 1917.
1,255,067.
Patented Jan. 29, 1918.
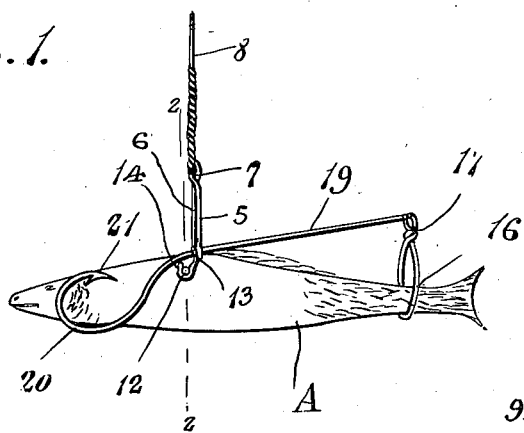
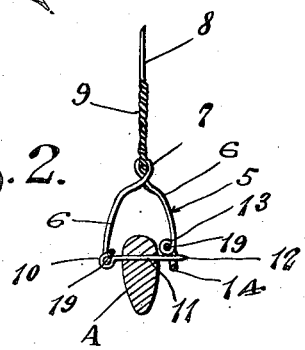
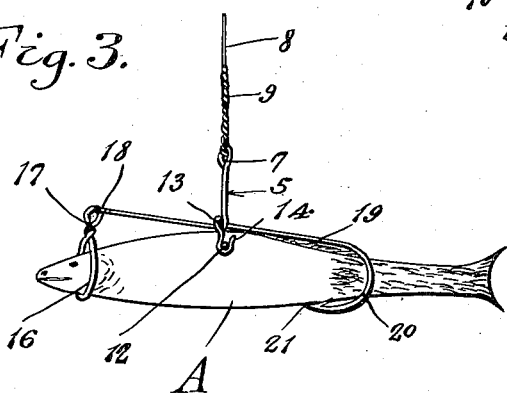
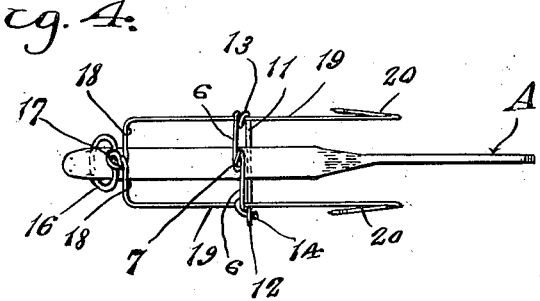
Inventor
W. E. Thatcher

UNITED STATES PATENT OFFICE.

WILLIS E. THATCHER, OF CAMERON, WISCONSIN.

FISH-HOOK.

1,255,067.  Specification of Letters Patent.  Patented Jan. 29, 1918.

Application filed August 22, 1917. Serial No. 187,629.

*To all whom it may concern:*

Be it known that I, WILLIS E. THATCHER, a citizen of the United States, residing at Cameron, in the county of Barron and State of Wisconsin, have invented certain new and useful Improvements in Fish-Hooks; and I do hereby declare the following to be a full, clear, and exact description of the invention, such as will enable others skilled in the art to which it appertains to make and use the same.

This invention relates to improvements in fish hooks.

The object of this invention is to provide a fish hook capable of being removably secured to live bait so as to hold the bait in its natural position and permits movement of the bait when in the water, thus increasing the catch of fish.

A still further object of this invention is to provide a hook capable of being used in still fishing or may be readily changed and secured to the bait so that the hooks may be used for casting or trolling.

A still further object of this invention is to provide a fish hook provided with bait retaining and supporting members, which supporting members permits it to be firmly secured to the bait so as to hold the bait in its natural position, thus permit it to swim in the water when cast over by the line.

A still further object of this invention is to provide a fish hook capable of being secured to either live bait, such as minnows, frogs or the like or artificial bait.

A still further object of this invention is to provide a fish hook of this character, which will be simple, practical and comparatively inexpensive in construction, and one that can be manufactured and sold at a low cost.

With these and other objects in view, the invention consists in the novel combination and arrangement of parts as will be hereinafter more fully described and claimed.

In the drawing:

Figure 1 is a side elevation of the hook applied to live bait illustrating the use of the hook for still fishing, Fig. 2 is a view taken on the line 2—2 of Fig. 1, Fig. 3 is a side elevation illustrating the hook applied to a bait trolling or casting, Fig. 4 is a top plan view of the same.

Like numerals of reference designate corresponding parts in all the figures of the drawings.

Referring to the drawing, the character A designates a live bait, it being illustrated as a minnow, and it is to be understood that the same could be a frog or other suitable live bait or the bait could be artificial.

My improved hook comprises a supporting member 5, which may be formed of any suitable material, such as steel or the like, and it comprises spaced arms 6, which have their upper ends curved inwardly and connected together by loop 7, which loop facilitates the attaching of a fishing line designated 8 thereto in the manner illustrated at 9.

The lower end of one arm 6 is looped to provide a bearing 10 and the terminal is bent upwardly and outwardly and is in a substantially horizontal plane defining the supporting arm 11, which his its terminal terminating into a needle point 12, which facilitates the arranging of the arm 11 transversely through the bait A. The other arm 6 is looped to provide a bearing member 13 and is extended downwardly and upwardly to provide a catch 14, which is adapted to support the free terminal of the arm 11 when passed transversely through the bait A.

The hook comprises a retaining loop 16, which has its terminals twisted as at 17 and bent laterally in opposite directions as at 18 to provide the spaced parallel arms 19. The arms 19 extend downwardly and are spaced outwardly from their connected portions with the terminal of the loop 16 and have their free terminals curved back upon themselves to define the hooks 20, which have the usual barbs 21 on the terminals thereof.

The arms 19 are adapted to be extended through the bearings 10 and 13 of the arms 6 and the supporting member 5, as clearly shown in Fig. 1.

The device illustrated in Figs. 1 and 2 shows the hooks or barbs 21 in a plane above the loop 16 and arranged on opposite sides of the head of the bait A, while the retaining loop 16 receives the tail thereof to facilitate the using of the hook for still fishing.

It will be apparent that when it is desired to use the same for trolling or casting, bend the retaining loop 16 downwardly in a plane substantially in the plane of the barbs 21, thus the head of the minnow or bait may be arranged in the retaining loop 16 and the arm 11 passed transversely through the back of the bait A, arranging the hooks 20 on opposite sides of the tail thereof as shown in Figs. 3 and 4 to facilitate casting or trolling of the bait.

In use, the hooks are arranged in the bearings 10 and 13 and the supporting arms 6, the arm 11 is disengaged from the catch 14 and arranged transversely through the bait as shown in Figs. 2, 3 and 4 and the device may be arranged in either position as previously described, thus facilitating the use of the hooks for trolling or casting or silent fishing.

What is claimed is:

1. A fish hook comprising an inverted U-shaped supporting member, bearings formed integrally with the eyes of the terminals of the arms of the U-shaped member, a bait retaining pin carried by one of the bearing eyes and detachably secured to the other arm, and bait supporting hooks removably and slidably mounted in the bearing eyes of the supporting members, as and for the purpose specified.

2. A fish hook comprising a supporting member, a retaining pin carried by said supporting member, a pair of fish hooks slidably supported by the member, and a retaining loop secured to one end of the hooks.

3. A fish hook comprising a supporting member including a pair of spaced arms, a connecting loop connecting one end of the arms, the terminals of the arms terminating into bearings, a pin secured to one of the bearings and extending horizontally therefrom, a catch carried by the other bearing to receive the free end of the pin, a pair of hooks including a retaining loop, spaced arms extending downwardly from the retaining loop, the terminals of the arms curved upwardly defining hooks having barbs, said arms of the hooks slidably arranged in the bearings of the supporting member, as and for the purpose specified.

4. A fish hook including a supporting member, bearing eyes formed integrally with the supporting member, a bait retaining pin carried by one of the supporting members and removably secured to the other supporting member, reversible fish hooks slidably and removably mounted in the bearing eyes of the supporting member, a retaining loop carried by the hook, said retaining hook facilitating the supporting of one end of the bait when arranged in the supporting member by the pin.

In testimony whereof I affix my signature in presence of two witnesses.

WILLIS E. THATCHER.

Witnesses:
M. C. HOWARD,
W. W. PIEPER.